United States Patent
Seiler

(10) Patent No.: US 10,737,665 B2
(45) Date of Patent: Aug. 11, 2020

(54) VEHICLE BRAKING BASED ON EXTERNAL OBJECT COMMUNICATIONS

(75) Inventor: Rebecca Lynne Seiler, Northville, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 362 days.

(21) Appl. No.: 13/596,501

(22) Filed: Aug. 28, 2012

(65) Prior Publication Data
US 2014/0067220 A1  Mar. 6, 2014

(51) Int. Cl.
*B60T 7/12* (2006.01)
*G06F 17/00* (2019.01)
*B60T 7/22* (2006.01)

(52) U.S. Cl.
CPC ...... *B60T 7/12* (2013.01); *B60T 7/22* (2013.01); *G06F 17/00* (2013.01); *B60T 2201/022* (2013.01); *B60T 2201/12* (2013.01)

(58) Field of Classification Search
CPC .......... B60T 7/12; B60T 7/22; B60T 2201/12; B60T 2201/022; B60T 2201/03; B60T 2201/22; G06F 17/00; G08G 1/22; G08G 1/164; G08G 1/163; G01S 19/40; G01S 2013/9325
USPC ................. 701/96, 300–301, 1, 70
See application file for complete search history.

(56) References Cited

U.S. PATENT DOCUMENTS

| | | | |
|---|---|---|---|
| 6,134,497 A * | 10/2000 | Hayashi et al. | 701/70 |
| 6,278,360 B1 * | 8/2001 | Yanagi | B60Q 1/525 180/281 |
| 6,517,172 B1 | 2/2003 | Bond, III et al. | |
| 6,523,912 B1 | 2/2003 | Bond, III et al. | |
| 6,607,255 B2 | 8/2003 | Bond, III et al. | |
| 6,659,572 B2 | 12/2003 | Bond, III et al. | |
| 6,775,605 B2 | 8/2004 | Rao et al. | |
| 7,018,004 B2 * | 3/2006 | Chen | B60T 7/22 188/1.11 R |
| 7,034,668 B2 | 4/2006 | Engelman et al. | |
| 7,418,346 B2 | 8/2008 | Breed et al. | |
| 8,676,431 B1 * | 3/2014 | Mariet et al. | 701/28 |
| 2004/0193374 A1 * | 9/2004 | Hac et al. | 701/301 |
| 2008/0172156 A1 * | 7/2008 | Joh et al. | 701/45 |
| 2010/0256836 A1 | 10/2010 | Mudalige | |
| 2010/0256852 A1 * | 10/2010 | Mudalige | G08G 1/22 701/24 |
| 2013/0041567 A1 * | 2/2013 | Yamashiro | B60T 7/22 701/96 |
| 2013/0054106 A1 * | 2/2013 | Schmudderich et al. | 701/96 |

FOREIGN PATENT DOCUMENTS

| | | |
|---|---|---|
| EP | 2001003 A1 | 12/2008 |
| WO | 2004008648 A2 | 1/2004 |

* cited by examiner

*Primary Examiner* — Nga X Nguyen
(74) *Attorney, Agent, or Firm* — Brooks Kushman PC; Frank Mackenzie

(57) ABSTRACT

A method for braking a host vehicle receives input indicative of transmitted travel data of an external object. A current distance between the host vehicle and the external object is calculated based upon travel data of the host vehicle and the external object. Pressure in a brake system of the host vehicle is precharged based upon the current distance, to reduce delay in a response of the brake system. A controller configured to perform the braking method is provided. A host vehicle is also provided with a brake system and the vehicle controller.

9 Claims, 3 Drawing Sheets

| DELAY RANGE (meters) | RANGE DELAY FACTOR (unitless) | BRAKE-PRESSURE_1 | BRAKE-PRESSURE_2 | BRAKE-PRESSURE_3 | BRAKE-PRESSURE_4 | DELAY BRAKE PRESSURE (BAR) |
|---|---|---|---|---|---|---|
| | | BRAKE-DELAY_1 | BRAKE-DELAY_2 | BRAKE-DELAY_3 | BRAKE-DELAY_4 | BRAKE SYSTEM DELAY TIME (SECONDS) |
| RANGE_1 | RANGE-FACTOR_1 | TIME-HORIZON_1a | TIME-HORIZON_1b | TIME-HORIZON_1c | TIME-HORIZON_1d | |
| RANGE_2 | RANGE-FACTOR_2 | TIME-HORIZON_2a | TIME-HORIZON_2b | TIME-HORIZON_2c | TIME-HORIZON_2d | |
| RANGE_3 | RANGE-FACTOR_3 | TIME-HORIZON_3a | TIME-HORIZON_3b | TIME-HORIZON_3c | TIME-HORIZON_3d | |
| RANGE_4 | RANGE-FACTOR_4 | TIME-HORIZON_4a | TIME-HORIZON_4b | TIME-HORIZON_4c | TIME-HORIZON_4d | |
| RANGE_5 | RANGE-FACTOR_5 | TIME-HORIZON_5a | TIME-HORIZON_5b | TIME-HORIZON_5c | TIME-HORIZON_5d | |
| RANGE_6 | RANGE-FACTOR_6 | TIME-HORIZON_6a | TIME-HORIZON_6b | TIME-HORIZON_6c | TIME-HORIZON_6d | |

BRAKE SYSTEM DELAY CALCULATION

FIG. 2

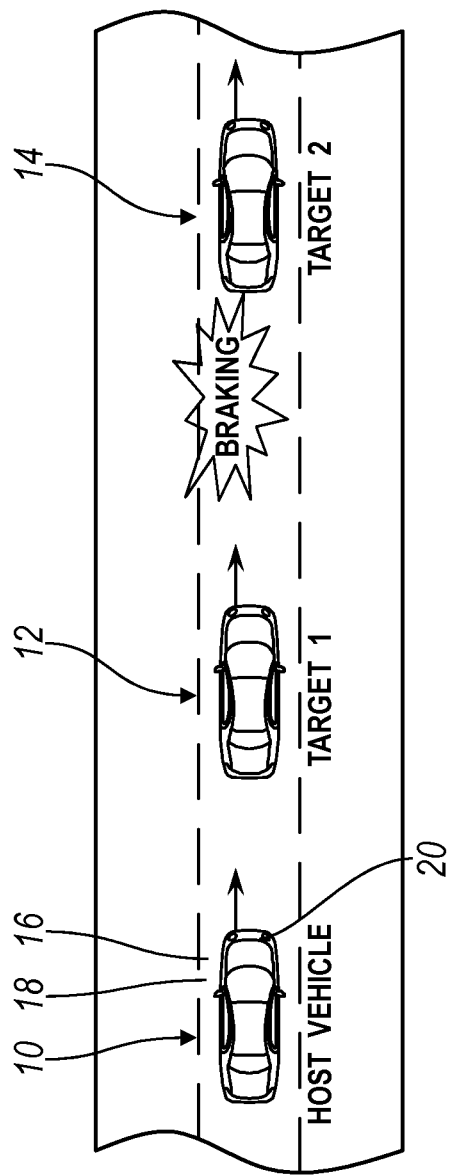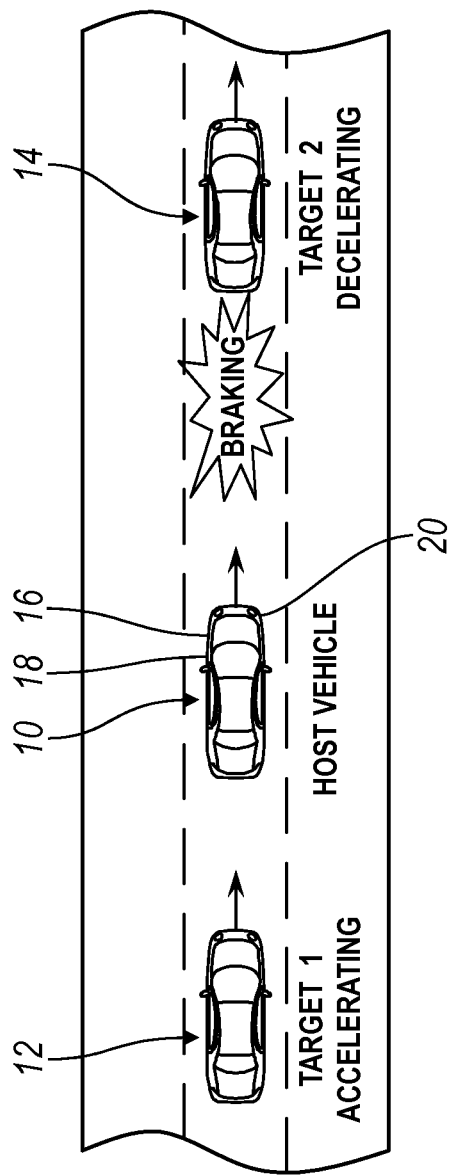

VEHICLE BRAKING BASED ON EXTERNAL OBJECT COMMUNICATIONS

TECHNICAL FIELD

Various embodiments relate to vehicle communications with external objects, and vehicle braking based on the communications with the external objects.

BACKGROUND

Operation of a motor vehicle requires a driver to be aware of multiple external factors, such as objects. Urban or city driving involves many varied and complex driving situations. City drivers are alert to other vehicles, buses, delivery trucks, bicyclists, pedestrians, parked cars, one-way streets, and various other factors. The presence of these various factors induces sudden changes to the driving environment and can make city driving challenging. Some examples of complexities associated with city traffic include: vehicles exiting parking structures; traffic coming from an alley way; vehicles that are parked/stationary; vehicles blocking the view of other traffic or pedestrians; pedestrians entering/exiting buses; delivery truck drivers going to-and-from their trucks; vehicles stopping suddenly; bicyclists; pedestrians; congested driving environments with intersections spaced close together; stop-and-go traffic; and various other situations.

Light detection and ranging (LIDAR) has been employed for detecting external objects. LIDAR can detect targets directly in front of the vehicle. LIDAR information on the vehicle ahead is utilized to obtain a target range and range rate and determine the possibility of collision. LIDAR employs three beams and has a range capability of zero to ten meters, with an effective detection range of one to eight meters. A horizontal field of view of LIDAR is typically twenty-five to twenty-seven degrees, with a vertical field of approximately seven degrees. A cycle time for LIDAR detection is approximately twenty milliseconds.

SUMMARY

According to at least one embodiment, a method for braking a host vehicle is provided by receiving input indicative of transmitted travel data of an external object. A current distance between the host vehicle and the external object is calculated based upon travel data of the host vehicle and the external object. Pressure in a brake system of the host vehicle is precharged based upon the current distance, to reduce delay in a response of the brake system.

According to at least one other embodiment, a vehicle controller for a host vehicle is configured to receive input indicative of transmitted travel data of an external object. The controller calculates a current distance between the host vehicle and the external object based upon travel data of the host vehicle and the external object. The controller transmits input indicative to precharge pressure in a brake system of the host vehicle based upon the current distance, to reduce delay in a response of the brake system.

According to at least another embodiment, a host vehicle is provided with a brake system. A vehicle controller is configured to receive input indicative of transmitted travel data of an external object, calculate a current distance between the host vehicle and the external object based upon travel data of the host vehicle and the external object, and transmit input indicative to precharge pressure in the brake system based upon the current distance, to reduce delay in a response of the brake system.

BRIEF DESCRIPTION OF THE DRAWINGS

FIG. 2 is a table for a brake system delay calculation for the flowchart of FIG. 1;

FIG. 3 is a schematic illustration of a vehicle according to an embodiment, illustrating one braking scenario; and FIG. 4 is a schematic illustration of a vehicle according to another embodiment, illustrating another braking scenario.

DETAILED DESCRIPTION

Figure 1:
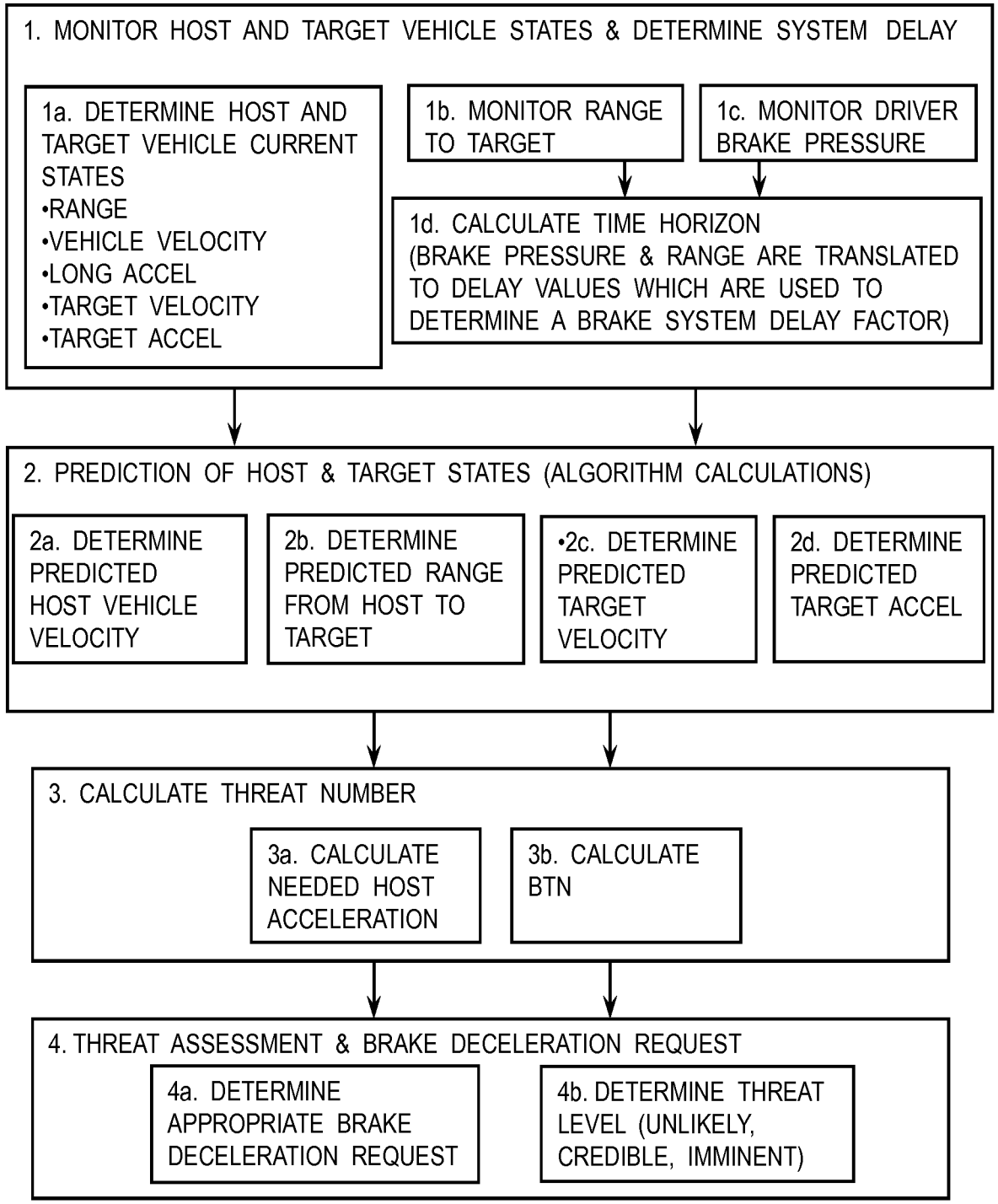
FIG. 1 is a flowchart of a method for braking a vehicle according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As discussed above, in various driving scenarios, the need to stop or otherwise decelerate suddenly occurs frequently. Preparing the brakes to respond quickly and efficiently in the need for a sudden stop is beneficial. The ability to provide enhanced and/or autonomous brake deceleration to the driver under potential collision conditions is also an effective way to mitigate/avoid possible collisions.

The proposed braking system utilizes vehicle communication technology often referred to as Vehicle-to-Vehicle (V2V) technology for detecting potential collision scenarios. The V2V information may be transmitted over a radio frequency. LIDAR is limited in range and lateral position capabilities. LIDAR can only detect targets directly in front of a host vehicle and does not easily see offset vehicles, adjacent/cut-in vehicles, etc. LIDAR is limited in detecting an accurate lateral position. LIDAR only provides information on which lobe, of three lobes, that the target is detected. LIDAR is limited to line-of-sight and cannot detect situations that are blocked by other objects. LIDAR does not accurately detect two vehicles ahead, traffic signal information, cut-in or cross-traffic, adjacent lane vehicles, and vehicles offset from the center of the host vehicle. V2V broadcast messages include information on surrounding vehicle range, range rate, acceleration/deceleration, etc. that can be used in a controller algorithm to preemptively prepare the brake system for a collision with vehicles ahead, behind, or cutting-in to the host vehicle path. V2V can provide driving information on multiple vehicles ahead and/or traffic light states, such that the controller can react both sooner and in more driving scenarios. V2V also provides greater range of detection.

There are also limitations in brake system response that affect brake performance. Typical pump actuation brake systems have delays in response behavior when responding to an autonomous brake request. For example, dead time can vary between 180-250 milliseconds. Dead time (or delay time) is a time interval between the start of the autonomous brake request and the start of actual torque or vehicle deceleration build-up. Rise time can be 300 milliseconds to one second depending on a particular braking request (linear relationship with request). Rise time is an interval of time required for the actual brake torque (or vehicle deceleration) build-up to go from ten percent to ninety percent of its final value. Time to achieve maximum requested deceleration varies with ambient temperature, coefficient of friction of road surface, and other variables.

The vehicle communication technology is utilized to receive input by a controller that is applied to a braking algorithm, which is illustrated in FIG. 1. The algorithm illustrated in FIG. 1 is similar to a prior art algorithm employed with LIDAR. The improvements presented in FIG. 1 relate to the information received, and consequently the improved collision avoidance permitted by processing additional information. The algorithm may be performed by the controller of a host vehicle.

In block 1, host and target vehicle states are monitored; and system delay is determined. In sub-block 1a, the host vehicle receives input indicative of transmitted travel data of an external object through V2V communications. The input may be indicative of a position of a target vehicle, range between the host and target vehicle, host vehicle velocity, longitudinal acceleration of the host vehicle, target vehicle velocity, target vehicle acceleration, and other variables. Although a target vehicle is discussed in the conventional V2V context, the invention contemplates that the target vehicle may be any external object configured to transmit data that can be received by the host vehicle. Likewise, the external object may be any number of external objects, such as multiple vehicles.

In sub-block 1b, a range to the target vehicle is monitored, which is a current distance between the target vehicle and the host vehicle. The range may be monitored by calculating a current distance between the host vehicle and the target vehicle based upon travel data of the host vehicle and the target vehicle. The host vehicle may receive input indicative of a transmitted coordinate position of the target vehicle; and monitor a coordinate position of the host vehicle for the calculating the range.

In sub-block 1c, driver brake pressure is monitored. In sub-block 1c, the controller monitors a brake pressure value, which is labeled Delay Brake Pressure in FIG. 2, which is a table for Brake System Delay Calculation. The range for brake pressure value is listed as the following calibration parameters (with units of Bar) which are tunable for each vehicle brake system: BrakePressure_1, BrakePressure_2, BrakePressure_3 and BrakePressure_4, which increase from BrakePressure_1 to BrakePressure_4. The brake pressure value is detected based on the driver achieved brake pressure in a master cylinder of the brake system. The brake pressure value translates into a brake response delay time labeled Brake System Delay Time. The range for the brake delay time is listed as the following calibration parameters (with units of seconds): BrakeDelay_1, BrakeDelay_2, BrakeDelay_3 and BrakeDelay_4 and correspond to the brake system delay or dead time associated with the brake pressures chosen in the Delay Brake Pressure values. The Brake System Delay Times reduce in value from BrakeDelay_1 to BrakeDelay_4.

In sub-block 1c, a range to the target vehicle is monitored from a Kalman Filter calculation as is known in the art, for a brake system delay range value labeled Delay Range with a range of the following calibration parameters (units of meters): Range_1, Range_2, Range_3, Range_4, Range_5 and Range_6, increasing from Range_1 to Range_6. The calibration parameters are chosen to span the operating range of the forward looking sensor. Although LIDAR is discussed, any suitable detection may be employed, such as radar, a camera system, or the like. The Delay Range value translates into another delay factor labeled Range Delay Factor, with a range of the following calibration values (unitless): RangeFactor_1, RangeFactor_2, RangeFactor_3, RangeFactor_4, RangeFactor_5 and RangeFactor_6, which decrease in value from RangeFactor_1 to RangeFactor_6.

When there is a brake request, the controller combines the "Brake System Delay Time" and "Range Delay Factor" as shown in FIG. 2 to calculate a Brake System Delay Factor named "TimeHorizon". The "TimeHorizon" is used in the prediction of host vehicle velocity, range to target, target vehicle velocity, and target acceleration. Later in the controller algorithm, these values are used to calculate the needed acceleration that is used for the brake deceleration request to avoid or mitigate collision. The TimeHorizon decreases in each row, for example, from TimeHorizon_1a to TimeHorizon_1d. The TimeHorizon also decrease in each column, for example, from TimeHorizon_1a to TimeHorizon_6a.

In block 2, host and target vehicle states are predicted. Block 2 utilizes the Time Horizon value to predict the host vehicle velocity at sub-block 2a, range to target at sub-block 2b, and target vehicle velocity at sub-block 2c.

Specifically, in sub-block 2a, predicted host vehicle velocity is calculated as follows: PredVehicleVelocity=HostVelocity (m/s)+HostAccel (m/s^2)*TimeHorizon (s). HostVelocity is the current host vehicle velocity; and HostAccel is the current host vehicle acceleration. For the units, m is meters and s is seconds.

In sub-block 2b, a predicted range from the host vehicle to the target vehicle is calculated as follows: PredictedRange=((TargetVelocity−HostVelocity)*TimeHorizon)+(TimeHorizon^2*0.5)*(TargetAccel−HostAccel)*1+Range. TargetVelocity is the current target vehicle velocity; and TargetAccel is the current target vehicle acceleration.

In sub-block 2c, a predicted velocity of the target vehicle is calculated as follows: PredTargetVelocity=TargetVelocity+TargetAccel*TimeHorizon.

In sub-block 2d, a predicted target acceleration may be determined by measuring a current acceleration of the target vehicle.

In block 3, a threat number is calculated. In sub-block 3a, a needed host acceleration is calculated. If the target is moving, the needed host acceleration is calculated as follows: NeededHostAccel (moving target)=−((RangeRate^2)/(2*Range))+TargetAccel. RangeRate is a current rate of change of the range. If the target is stationary, the needed host acceleration is calculated as follows: NeededHostAccel (stationary target)=−1*(HostVelocity^2)/((−0.5*(TargetVelocity^2)/TargetAccel)+Range)*2.

The predicted host and target vehicle states determined in block 2 are used for calculating a Brake Threat Number (BTN). The BTN is an estimation of how much brake deceleration is required to avoid collision. In sub-block 3b, the BTN is calculated as a threshold for requesting the autonomous braking, as follows: BTN=NeededHostAcc/MaxBrakeAcc. MaxBrakeAcc is a maximum braking acceleration achievable by the host vehicle.

In block 4, a threat assessment and a brake deceleration request are determined. A brake deceleration request is determined as equivalent to the needed host acceleration in sub-block 4a. In sub-block 4b, a threat level is determined as unlikely, credible, or imminent, based on the BTN calculation. If the threat level is determined as credible, the master cylinder of the braking system is precharged in order to reduce delay in a response of the brake system. According to another embodiment, if the threat level is credible or imminent, the brake system may autonomously brake the vehicle.

The proposed controller utilizes V2V information to expand current functionality to many more driving scenarios and conditions and prepare the system sooner than what is capable from a LIDAR. V2V provides more information including target vehicle range, lateral position, deceleration, driver brake apply status, etc.

Vehicle status/information for two or three vehicles ahead (range, vehicle deceleration, DBA status, etc.) is provided. For example, FIG. 3 illustrates a host vehicle 10 receiving V2V status information from a first target vehicle 12 and a second target vehicle 14. The host vehicle 10 has a controller 16, a receiver 18, and a brake system 20. Under this scenario the braking/deceleration of the second target vehicle 14 may be factored into braking of the host vehicle 10 before the first target vehicle 12 reacts to the braking of the second target vehicle 14. Thus, unlike LIDAR, the host vehicle 10 is not dependent only upon information that is sensed from the immediately preceding first target vehicle 12. Vehicle status on adjacent lane vehicles and vehicles behind the host vehicle may also be communicated to the host vehicle 10.

Information on stop lights (status of red/yellow/green and timing) may be communicated to the host vehicle 10 to estimate the deceleration of the host vehicle 10. Other oncoming traffic information may also be communicated to the host vehicle 10.

V2V may provide enhanced capability of target identification and classification, such as distinguishing a pedestrian from a vehicle, determining whether a vehicle is stationary versus other stationary objects in the host vehicle path (tree, pole, etc.). Of course all external objects may employ a transmitter for communicating to a receiver in the host vehicle 10. Alternatively, stationary objects such as trees and poles may have communication that is stored in a nearby transmitter, such as in a pole or traffic light.

V2V information can be used to calculate a predicted target acceleration using target vehicle state information (range, vehicle deceleration) from one or two targets ahead and/or information on stop light (range to intersection, timing of stop light). The predicted target acceleration feeds into the BTN calculation and optimizes the timing of the autonomous brake request to avoid the collision.

V2V information from the target vehicle directly ahead (as well as two target vehicles ahead) is used to modify predicted target velocity, predicted range to target and predicted host velocity according to at least one embodiment. V2V target information includes: range to target, target deceleration, target driver brake status, etc. The advantage of utilizing V2V vehicle state information is that information is available on more than just the target vehicle directly ahead of the host vehicle. Traffic patterns of several vehicles ahead can be monitored and used to prepare the host vehicle for a last minute hard deceleration. The optimized predicted values are used in the needed acceleration calculation to determine a more effective brake deceleration request.

Referring now to FIG. 4, V2V information from the first target vehicle 12, which is trailing the host vehicle 10, and V2V information from the second target vehicle 14 which is leading the host vehicle 10 is utilized in autonomous brake requests that are optimized to mitigate both forward collision and rear end collision.

The host vehicle brake system is prepared by "precharging" the brakes when information is known on stop light status and or traffic patterns. The brake system is pre-charged to prepare for a quick stop under the various scenarios, such as when stop light ahead is turning yellow and/or red; when traffic patterns are known and several vehicles ahead are decelerating; or when the target vehicle directly ahead (or two vehicles ahead) is (are) decelerating at a certain rate.

V2V information processing allows another threshold to achieve Emergency Brake Assist (EBA) based on threat AND/OR a stack up of traffic information (light changed to red, two vehicles ahead has a deceleration>=max value, one vehicle ahead has a deceleration>=max value, etc.). Ambient temperature, coefficient of friction and/or other braking related data may be received from V2V communications to modify brake delay value.

A threat calculation based on the ability to steer away from the possible collision may be utilized since lateral position information is known through V2V information. V2V information can be used to determine when a cut-in is going to occur (that may be calculated from vehicle lateral/longitudinal velocities, vehicle yaw, steering, braking, acceleration, etc.) to prepare the brake system with pre-charge and a lowered EBA threshold. A warning of a cut-in scenario may be indicated to the driver on an A-pillar or a mirror. The controller can update or optimize a threat number for the possible cut-in with lateral position information.

According to the study "Definition of a Pre-Crash Scenario Typology for Vehicle Safety Research", Volpe National Transportation Center and NHTSA, Paper Number 07-0412, the 2004 GES crash database indicates the top four pre-crash scenarios include: lead vehicle stopped, control loss without prior vehicle action, vehicle(s) turning at non-signalized junctions, and lead vehicle decelerating. By including vehicle-to-vehicle information to the capabilities of the controller, information on the lead vehicle will be available more quickly to detect and react to these scenarios.

The vehicle controller 16 includes one or more algorithms or methods for braking the vehicle 10 by pre-charging or activation of the brake system 20. These methods may be implemented individually or in combination with one or more methods. The controller 16 generally includes any number of microprocessors, ASICs, ICs, memory (e.g., FLASH, ROM, RAM, EPROM and/or EEPROM) which co-act with software code to perform the operations of the method(s).

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A host vehicle comprising: a brake system; and a vehicle controller configured to:
    receive input indicative of travel data transmitted from both leading and trailing external objects, and
    transmit data to perform only one of a precharge to the brake system and an actuation of the brake system based on a threat level determined from a current distance between the objects,
    wherein the threat level is based on a brake threat number being determined by a ratio of a needed host acceleration and a maximum brake acceleration, the needed host acceleration being based on a range; wherein the range is a current distance between the objects and the host vehicle; and wherein the leading and trailing external objects are target vehicles.

2. The host vehicle of claim 1, wherein the brake system is precharged when the threat level is credible.

3. The host vehicle of claim 2, wherein the brake system is actuated when the threat level is imminent.

4. The host vehicle of claim 3, wherein the threat level is based on a brake threat number.

5. A host vehicle comprising: a brake system; and a vehicle controller programmed to:
   receive input indicative of travel data transmitted from both leading and trailing external objects, and
   transmit data to perform only one of a precharge to the brake system and an actuation of the brake system based on a threat level,
   wherein the threat level is based on a brake threat number being determined by a ratio of a needed host acceleration and a maximum brake acceleration, the needed host acceleration being based on a range; wherein the range is a current distance between the objects and the host vehicle; and wherein the leading and trailing external objects are target vehicles.

6. A host vehicle comprising: a brake system; and a vehicle controller configured to:
   receive input indicative of travel data transmitted from both leading and trailing external objects, and
   transmit data to perform only one of a precharge to the brake system and an actuation of the brake system based on a threat level threshold determined from a current distance between the objects,
   wherein the threat level is based on a brake threat number being determined by a ratio of a needed host acceleration and a maximum brake acceleration, the needed host acceleration being based on a range; wherein the range is a current distance between the objects and the host vehicle; and wherein the leading and trailing external objects are target vehicles.

7. The host vehicle of claim 6, wherein the brake system is precharged when the threat level threshold is credible.

8. The host vehicle of claim 7, wherein the brake system is actuated when the threat level threshold is imminent.

9. The host vehicle of claim 8, wherein the threat level threshold is based on a brake threat number.

* * * * *